United States Patent [19]
Mountcastle, Jr.

[11] Patent Number: 5,210,997
[45] Date of Patent: May 18, 1993

[54] ARTICULATED BOOM TRACTOR MOUNTED CUTTER ASSEMBLY

[76] Inventor: Deliston L. Mountcastle, Jr., 1034 Rosemary Ave., Roanoke, Va. 24014

[21] Appl. No.: 878,433

[22] Filed: May 4, 1992

Related U.S. Application Data

[63] Continuation-in-part of Ser. No. 701,822, May 17, 1991, abandoned.

[51] Int. Cl.⁵ .................. A01D 34/64; A01D 34/86
[52] U.S. Cl. ........................ 56/15.2; 56/15.5; 56/11.9; 56/235
[58] Field of Search ............ 56/15.5, 15.1, 15.2, 56/14.7, 11.9, 235

[56] References Cited

U.S. PATENT DOCUMENTS

| | | | |
|---|---|---|---|
| 3,274,762 | 9/1966 | Jolls | 56/15.2 |
| 3,949,539 | 4/1976 | Cartner | 56/15.5 X |
| 4,502,269 | 3/1985 | Cartner | 56/15.5 |
| 4,869,056 | 9/1989 | Lynch | 56/15.2 |
| 4,873,818 | 10/1989 | Turner | 56/15.5 X |
| 4,887,417 | 12/1989 | Parsons, Jr. | 56/15.5 X |
| 4,912,916 | 4/1990 | Parsons, Jr. | 56/15.2 |
| 4,956,965 | 9/1990 | Parsons, Jr. | 56/15.1 |
| 4,996,830 | 3/1991 | Davison | 56/14.7 |

OTHER PUBLICATIONS

Boom Mower-Tiger Corporation, Sioux Falls, S.D.
Hydramower-Turner International Engineering Ltd., Model SM650, two pages.
Terrain King-Alamo Group, articulated boom mowers, Seguin, Texas, 4 pages.
Boom Mower-Motrim Inc., Telescopic and articulated arm, Model MT-28-5R, Cambridge, Ohio, 4 pages.

*Primary Examiner*—Stephen J. Novosad
*Attorney, Agent, or Firm*—Mason, Fenwick & Lawrence

[57] ABSTRACT

A vegetation cutter is mounted on the end of an articulated boom supported for horizontal and vertical movement on a relatively small tractor by removable frame means. The frame means includes front to rear extending left and right longitudinal side frames which are connected by a U-shaped frame extending over the motor housing of the tractor and connected at its lower end portions to the side of the frame members. A rotary vegetation cutting housing is pivotally attached to the outer end of the articulated boom by a unique linkage means permitting the housing to be pivoted about a horizontal pivot through an arc in excess of 180°. A hydraulic motor on the cutter housing drives a cutter blade through a unique non-tapered cutter shaft which is held in the housing in the event of bearing seizure by unique drive means which precludes the rotating blade from dropping from the housing to create an accident hazard.

18 Claims, 9 Drawing Sheets

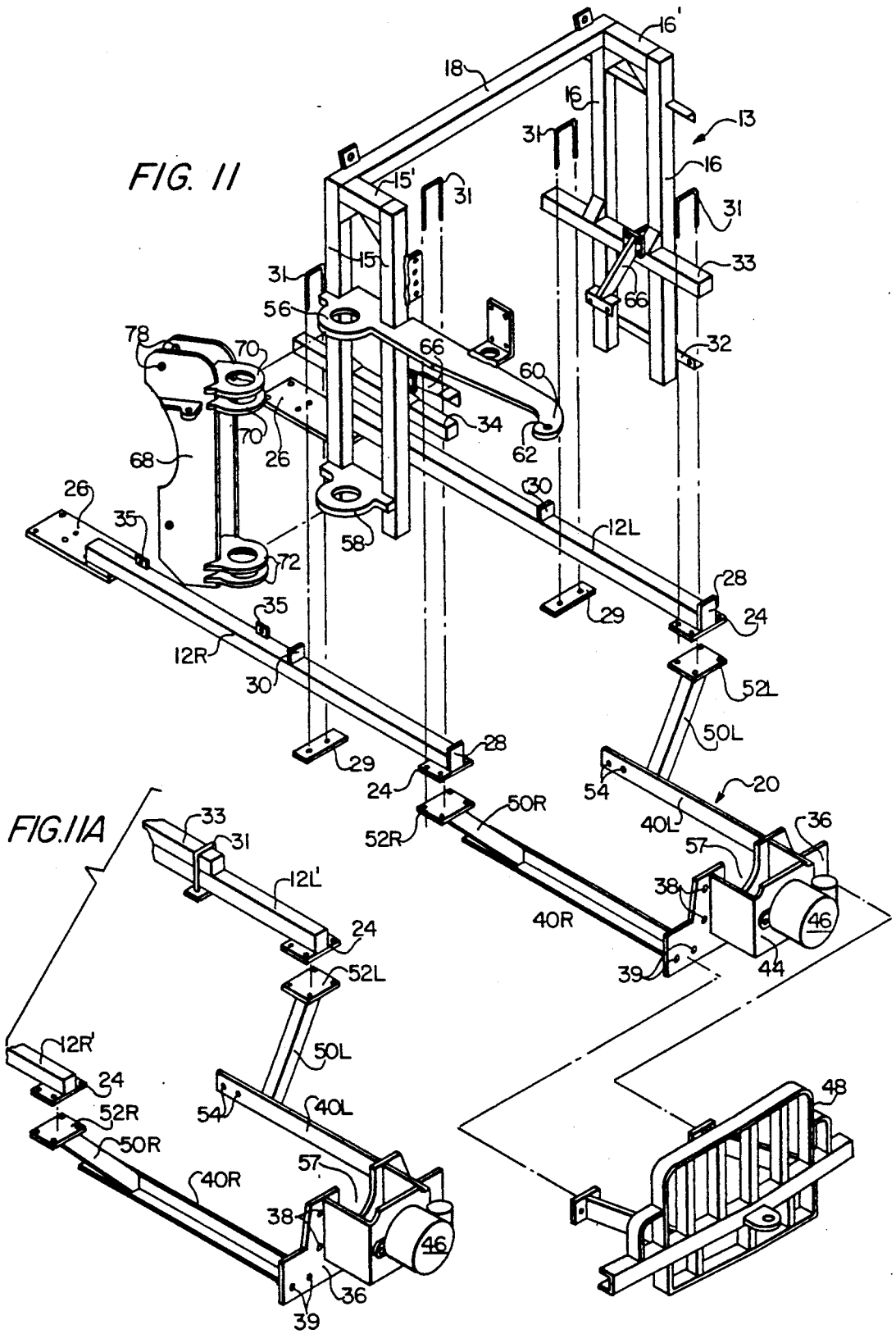

ARTICULATED BOOM TRACTOR MOUNTED CUTTER ASSEMBLY

CROSS-REFERENCE TO RELATED APPLICATION

This application is a continuation-in-part of earlier application Ser. No. 07/701,822 filed May 17, 1991, now abandoned.

BACKGROUND OF THE INVENTION

The present invention is in the field of tractor-mounted rotary blade type cutters used for cutting grass, weeds and other vegetation such as, for example, along the shoulder of a road, railroad rightsofway and the like. More specifically, the present invention is directed to a unique articulated boom supported blade type cutter that can be mounted on a relatively lightweight tractor such as those in the 35-50 HP class without using integral or other counterweights or exceeding the maximum operating weight of the tractor and which is operated by hydraulic fluid provided by pumps driven by the tractor motor. One reason the prior known devices have required the use of larger and heavier tractors is the fact that they have universally employed separate counterweights which serve no purpose other than to counterbalance the weight of the boom and cutter head assembly.

Rotary blade type vegetation cutters have been used on tractors and other vehicles for many years. However, the prior known vegetation cutters have suffered from a number of drawbacks including having excessively high center of gravity and being of excessive weight so as to require their usage with larger tractors, a fact which renders them unusable with smaller and lighter more economical to operate tractors. The excessive weight of prior art vegetation cutters is resultant from their use of counterweights which are made necessary by their high center of gravity and/or ungainly design and configuration.

Another problem with the prior known rotary blade vegetation cutters has been that many of such cutters have employed a chain drive power transmission to the cutter blade which creates substantial and expensive maintenance and safety problems including the fact that the chain must be enclosed in a housing which adds to the fabrication expense of the device. Proper alignment of the various components of such systems is also difficult to obtain.

An additional problem with tractor mounted prior art rotary blade vegetation cutters is low ground clearance due to the fact that they employ transverse frame members extending beneath the motor of the tractor to connect frame components such as the boom and hydraulic reservoir respectively on opposite sides of the tractor motor.

Yet another problem with the prior known rotary blade type vegetation cutters is that they employ complicated hydraulic circuitry which frequently uses high back pressure in the order of 500 psi in the exhaust circuit and which requires the use of additional coolers for preventing overheating of the hydraulic fluid. Such prior art systems also use bypassing of the hydraulic circuitry to permit stopping of the blade assembly.

Yet another problem with the prior known rotary blade type cutters resides in the fact that they are complicated and consequently the installation on and removal of such cutters from a tractor is time-consuming and expensive. The foregoing problem is all the more critical because of the fact that the cutter must be removed in many instances when maintenance is required for either the tractor or the cutter so that labor and downtime required in such removal and the subsequent reattachment to the tractor is a substantial component of the total operating expense. Many prior art vegetation cutters employ an expensive to fabricate tapered cutter shaft or spindle to which the blade is attached with the cutter shaft being held in position by a threaded nut or similar retainer threaded on a tapered spindle in a manner which, when the cutter shaft is jammed by bearing failure, which can be caused by a variety of events, rotates off and clears the end of the cutter shaft or spindle to cause the spindle and cutter blade to be dropped to the ground to create the need for a time consuming remounting of the blade assembly in the housing.

Another problem with prior known devices in the tractor mounted rotary vegetation cutter art is that the devices do not snugly secure the equipment for over-the-road travel with some devices merely relying upon hydraulic locking of the components in position so that any failure in the "locked" circuit could result in a dangerous release of the equipment. Other devices rely upon mechanical retention of the parts by hooks or other means which can accidentally come loose and release the equipment.

Therefore, it is the primary object of the present invention to provide a new and improved vegetation cutter capable of being mounted on a relatively small tractor.

A further object of the present invention is the provision of a new and improved vegetation cutter that can be easily attached and/or removed from a tractor.

Yet another object of the present invention is the provision of a new and improved vegetation cutter employing hydraulic circuitry operable by hydraulic power at lower pressure than prior known vegetation cutters.

Yet another object of the present invention is the provision of a new and improved vegetation cutter not requiring counterweights for satisfactory operation when installed on a tractor.

A further object of the present invention is a provision of a new and improved blade mount assembly for a vegetation cutter in which the blade does not drop from the assembly upon seizure of a bearing.

Another object of the present invention is the provision of a hydraulically powered vegetation cutter in which shutdown of the blade is effected without hydraulic bypassing of power fluid to permit a rapid shutdown in emergency situations.

A further object of the invention is the provision of a new and improved latch means for holding the components of a vehicle mounted vegetation cutter in a travel position in a secure and safe manner.

SUMMARY OF THE INVENTION

The foregoing and other objects of the invention are achieved by the preferred and alternative embodiments of the invention both of which comprise an easy to assemble cutter, articulated boom and framework that can be easily and quickly mounted on or removed from a tractor. The framework comprises two main side front to rear extending horizontal side frames to the rear ends of which connector means are provided for attachment to the rear axle housing of a tractor. The forward ends of the front to rear extending side frames are connected to a U-shaped front frame extending forwardly beyond the forward end of the tractor and providing a support for a hydraulic pump driven from the tractor power takeoff providing pressurized hydraulic fluid to a boom-mounted cutter housing. The supporting framework additionally includes a U-shaped bridge frame joining the horizontal front to rear extending side frame members and including vertical side legs extending upwardly alongside the engine housing and a horizontal coupling beam connected to the upper ends of the side legs and extending across and above the engine housing. The articulated boom on which the cutter unit is mounted is attached by hinge means provided on one of the vertical side legs of the U-shaped bridge frame and a main reservoir for hydraulic fluid used for the operation of the cutter unit is mounted on the opposite vertical side leg of the frame. The resultant construction has a low center of gravity and it is consequently not necessary to use the additional counterweights in order for the system to function effectively.

The unit is ideal for use in residential areas with narrow streets, two-lane rural roads, cutting over obstacles area such as guard rails and the like, traffic control fences and along the right-of-way of both roads and railroads. The unit can reach outwardly sixteen (16) feet from the center line of the tractor and has a vertical reach of thirteen feet, the boom being capable of swinging through an arc of 120°.

Proper balance of the assembly is enabled by virtue of the fact that the structural frame on which the boom is supported is attached to the tractor at its strongest load bearing points at a relatively low level on the tractor. Moreover, the attachment of the frame assembly increases the strength of the tractor chassis. The center of gravity of the assembly is at an extremely low point without any reduction of the ground clearance of the tractor.

BRIEF DESCRIPTION OF THE DRAWINGS

FIG. 8 is an elevation view, partially in section, of blade spindle housing means for conveying rotary force from a hydraulic drive motor to the cutter blade of the preferred embodiment;

FIG. 9 is an exploded perspective view of drive and bearing components of the blade spindle of FIG. 8;

FIG. 11 is an exploded perspective view of the cutter unit support frame assembly;

FIG. 11A illustrates a modified version of the support frame usable on longer wheel base tractors than the smaller tractors usable with the support frame of FIG. 11;

Figure 1:
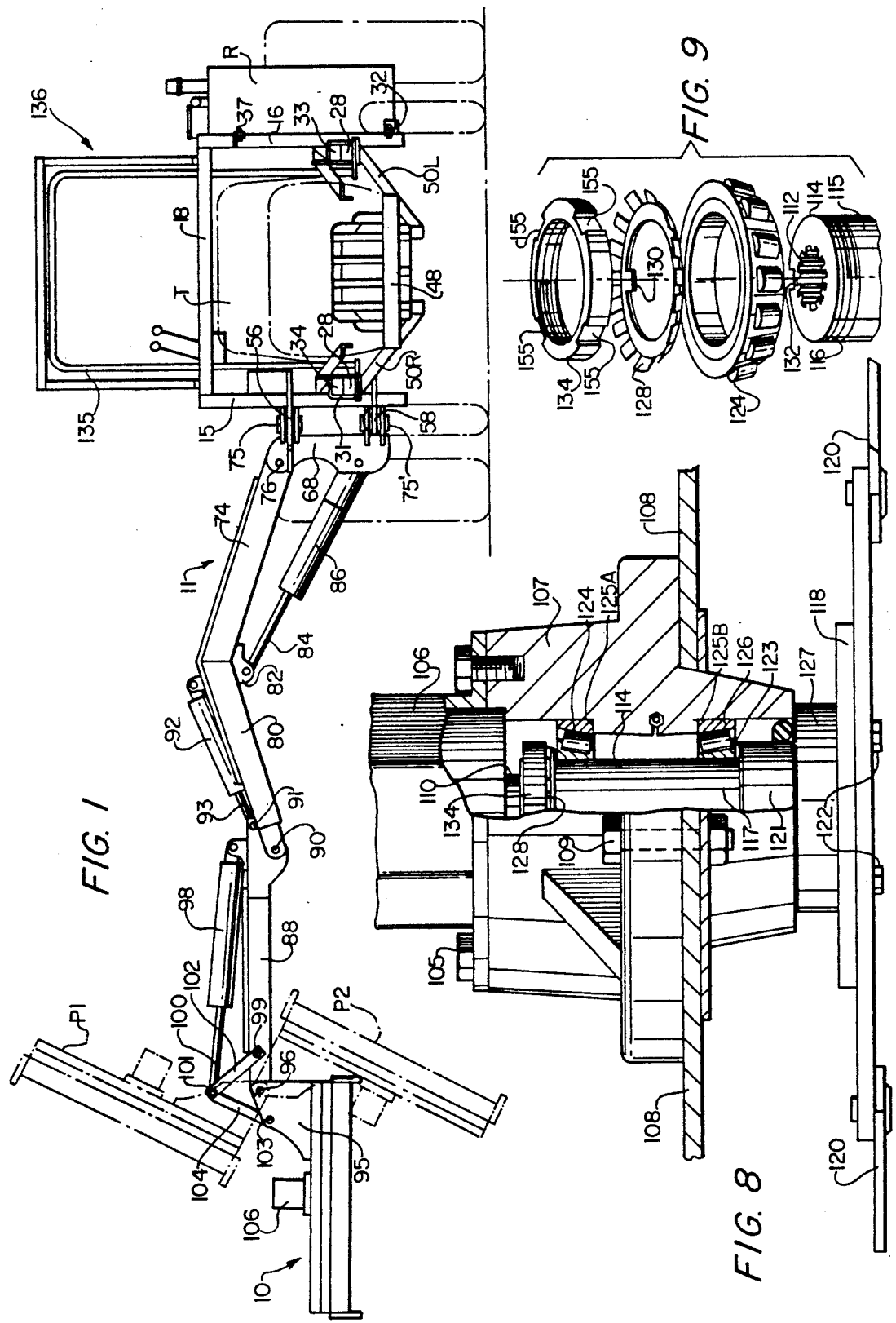
FIG. 1 is a front elevation view of the preferred embodiment of the invention in an extended boom condition relative to a small tractor illustrated in phantom on which the preferred embodiment is mounted.

Turning first to FIG. 1, it will be noted that the preferred embodiment of the invention comprises a hydraulically driven blade type vegetation cutter mounted in a housing generally designated 10 which is removably mounted on and attached to a conventional small tractor T such as a Ford Model 2910 tractor unit by a horizontally and vertically swingable articulated boom 11. The tractor T is illustrated in phantom in the drawings. The preferred embodiment of the invention employs a boom support frame which is mounted on the tractor and includes a plurality of sub-component frame members which are connected together to extend around the motor housing chassis components of the tractor. Frame components of the preferred embodiment are bolted to the rear axle housings, the bell housing and the tractor frame to provide a rigid connection of the boom supporting frame to the tractor which actually enhances the strength and rigidity of the tractor.

More specifically, the boom support frame includes right and left (as viewed by the driver of the tractor) front to rear extending horizontal side frames 12R and 12L (FIG. 11) to which are connected a transverse inverted U-shaped coupling or bridge frame extending up and over the tractor motor, the coupling or bridge frame being generally designated 22. Coupling or bridge frame 22 is formed of a right vertical leg means 15, and left vertical leg means 16 each of which vertical leg means comprises two vertical constituents respectively connected at their upper ends by welding to top connectors 15' and 16' with a transverse horizontal coupling bridge beam 18 or frame being welded to the upper ends of the vertical leg means 15 and 16.

Figure 12:
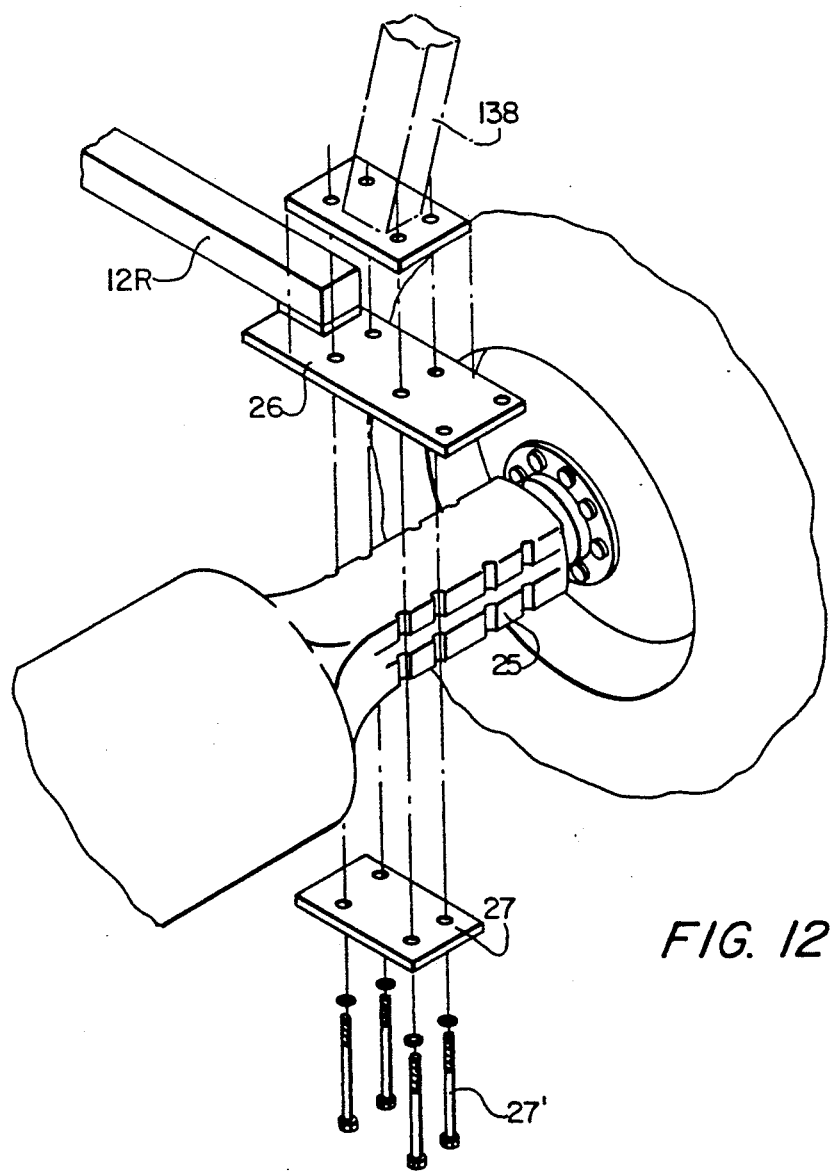
FIG. 12 is an exploded perspective view illustrating the manner of connection of the boom support frame and a portion of a roll-cage to the rear axle of the tractor.

A U-shaped horizontal front frame 20 (FIG. 11) is connected to the forward ends of the side frames 12R and 12L by right and left front connection permitting means comprising apertured front plates 24 welded to the forward lower end surfaces of the side frames 12R and 12L. Left and right rear connection permitting means comprising rear plates 26 are welded to the rear extent of the front to rear extending horizontal side frames 12L and 12R and are apertured to permit firm attachment to the rear axle housings 25 by the use of retainer plates 27 and bolts 27' in the manner shown in FIG. 12. Additionally, it should be observed that each of the front to rear extending horizontal side frames 12L and 12R has a front positioner plate 28 and a rear positioner plate 30 welded in position in FIG. 11.

Figure 2:
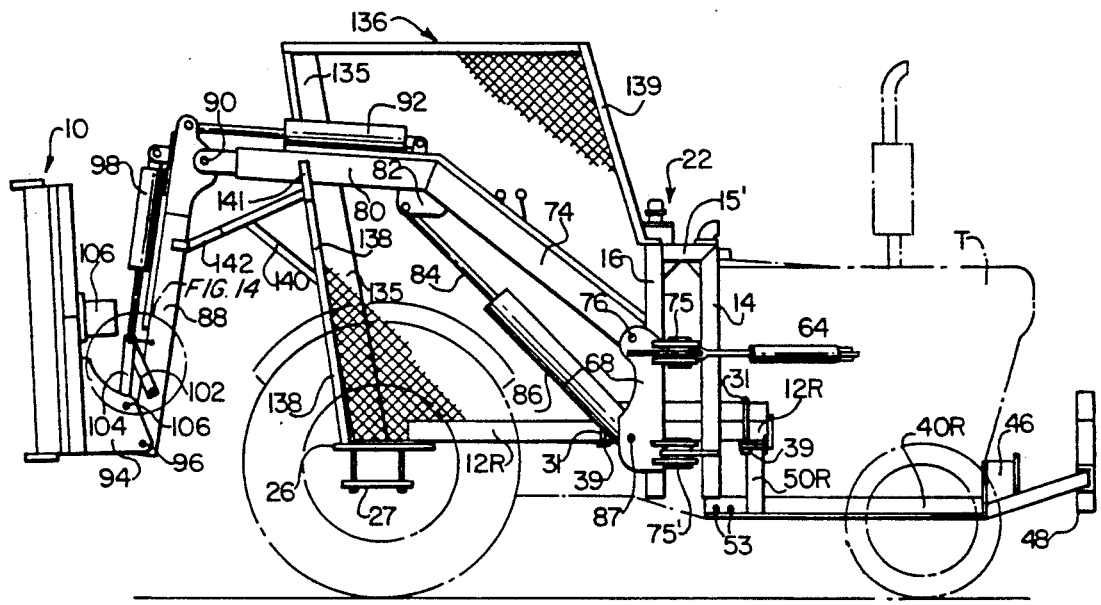
FIG. 2 is a right side elevation view illustrating the cutter assembly on boom support in a trailing over-the-road travel position assumed when the tractor is being driven from one location to another.

A left box beam 33 (FIG. 11) is welded to the left vertical legs 16 and is positioned and dimensioned to fit between the front and rear positioner plates 28 and 30 of the left side frame 12L. In like manner, a right box beam 34 is welded to the right vertical leg means 15 and rests on the upper surface of the right front to rear extending horizontal side frame 12R between the positioner plates 28 and 30 welded to the side frame 12R as shown in FIG. 11. Box beams 33 and 34 are held in position on side frames 12L and 12R by U-bolts 31, retainer plates 29 and associated nuts 39 (FIGS. 2 and 11). Thus, the front to rear extending horizontal side frames 12L and 12R provide support for the U-shaped bridge frame 22 in a manner that will be obvious from inspection of FIG. 11. An angle member 32 (FIG. 11) is welded to left vertical legs 16 and engages and supports the lower end of hydraulic fluid reservoir R (FIG. 1) the upper end of which is also attached to vertical legs 16 by bracket and bolt means 37 (FIG. 1). It should also be noted that apertured tabs 35 which provide a function to be discussed later, are welded to the upper inner surface of side frame 12R as shown in FIG. 11.

The U-shaped front frame 20 comprises a transverse front plate 36 (FIG. 11) having connection permitting means in the form of apertures 38 which permit bolting of the transverse front plate to the front tractor frame portion. A right hand trailing frame 40R is welded at its front end to the rear surface of transverse front plate 36 and a left hand trailing frame 40L is similarly welded at its front end to the rear surface transverse front plate 36. Similarly, a U-shaped pump mounting bracket 44 is welded to the front surface of the transverse front plate 36 and provides support for a hydraulic pump 46 positioned to receive power from a power train including a flex coupler and a shaft extending through an opening 57 in plate 36 from the front power takeoff of the tractor. Additionally, a pump protecting front guard grill 48 is bolted to, and forwardly of, the transverse front plate 36 by bolts received in boltholes 49 of plate 36 in the manner best apparent from FIG. 11.

The output from pump 46 goes into an electrically controlled solenoid unloading pressure relief valve 47 and a pressure controlled check valve 49 (FIG. 4) and the inlet of the pump is connected by supply hose 43 to reservoir R. A fluid return hose 45 is also connected to reservoir R.

Figure 13:
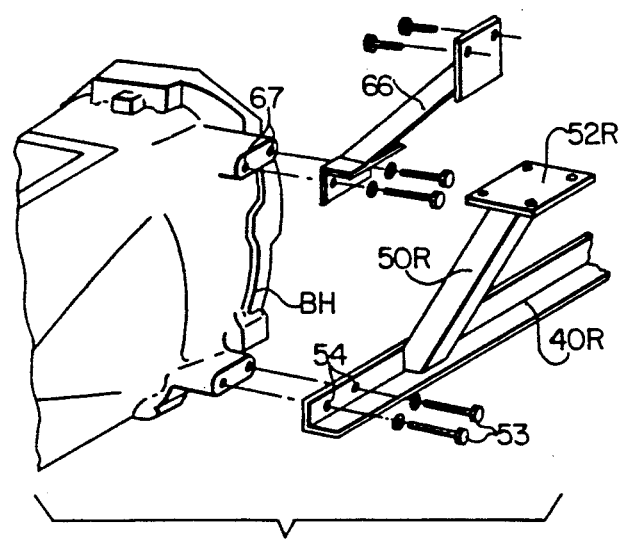
FIG. 13 is an exploded perspective view illustrating the manner of attachment of the frame components to the bell housing of the tractor.

The rear end portions of the trailing frames 40R and 40L are each respectively connected by canted drop frame members 50R and 50L to apertured connector plates 52R and 52L at the upper ends of the drop frame members with the apertures in the plates 52 and 52L being alignable with the apertures in the plates 24 on the front ends of the front to rear extending horizontal side frames 12L and 12R. Additionally, two apertures 54 (FIG. 11) near the rear ends of the trailing frames 40R and 40L permit the trailing frames to be bolted to the bell housing BH by bolts 53 in the manner shown in FIGS. 2, 3 and 13.

FIG. 11A illustrates a second embodiment which is mounted on longer wheelbase tractors than the first embodiment. The second embodiment differs from the first embodiment solely in the use of right and left front to rear extending frames 12L' and 12R' that are longer than corresponding frames 12L and 12 of the first embodiment and in the use of nuts and bolts (not shown) for connecting plates 24 to connector plates 52R and 52L instead of U-bolts as used in the first embodiment.

The U-shaped coupling or bridge frame 22 includes upper and lower fixedly positioned hinge component support plates 56 and 58 welded to the right vertical leg members 15 with the upper hinge support plate 56 including a forwardly extending portion 60 (FIG. 11) having a mounting aperture 62 for providing a pivotal support for a boom swing cylinder 64. Additional bracing for the vertical leg means 15 and 16 is provided by canted stabilizer brace members 66 bolted between the vertical leg members and tapped bores 67 in the bell housing BH as shown in the FIG. 13.

A boom swing bracket 68 (FIG. 11) has a pair of spaced parallel upper hinge plates 70 which are positioned over the upper hinge support plate 56 which is sandwiched between the plates 70. In like manner the lower hinge support plate 58 is sandwiched between a pair of lower hinge plates 72 with aligned upper and lower pivot pins 75 and 75' (FIG. 1) retaining the boom swing bracket 68 in position for pivotal movement about the vertical axis of the aligned pivot pins 75 and 75'. Thus, the upper support plate 56 and the lower support plate 58 comprise a fixed hinge component and swing bracket 68 and plates 70, 72 comprise a movable hinge component all of which cooperate to define a boom hinge.

The articulated boom consists of an inner or lift boom or beam formed of a box configuration dimensioned 5"×5"×⅜" including an inner boom component 74 pivoted at 76 in aligned apertures 78 (FIG. 11) of the boom swing bracket 68 for pivotal movement about a horizontal axis and an outer boom component 80 oriented at an angle of approximately 35° to the inner boom component 74 and formed and welded to the outer end of the inner boom component 74. A rod bracket 82 on inner boom component 74 is pivotally connected to the outer end of a rod 84 of a lift cylinder 86 pivoted at its base end to boom swing bracket 68 by pivot pin 87. Operation of lift cylinder 86 pivots the inner boom 74, 80 in either an up or down direction about pivot 76 in an obvious manner.

A reach beam 88 comprising a square box beam (4"×4"×¼") is pivoted at 90 to the outer end of the outer boom component 80 of the lift beam. Pivotal movement of the reach beam 8 about pivot 90 in either direction is controlled by reach cylinder 92 having a rod 93 pivotally connected at 91 to reach beam 88 in a manner that will be clear from inspection of FIG. 1.

Figure 10:
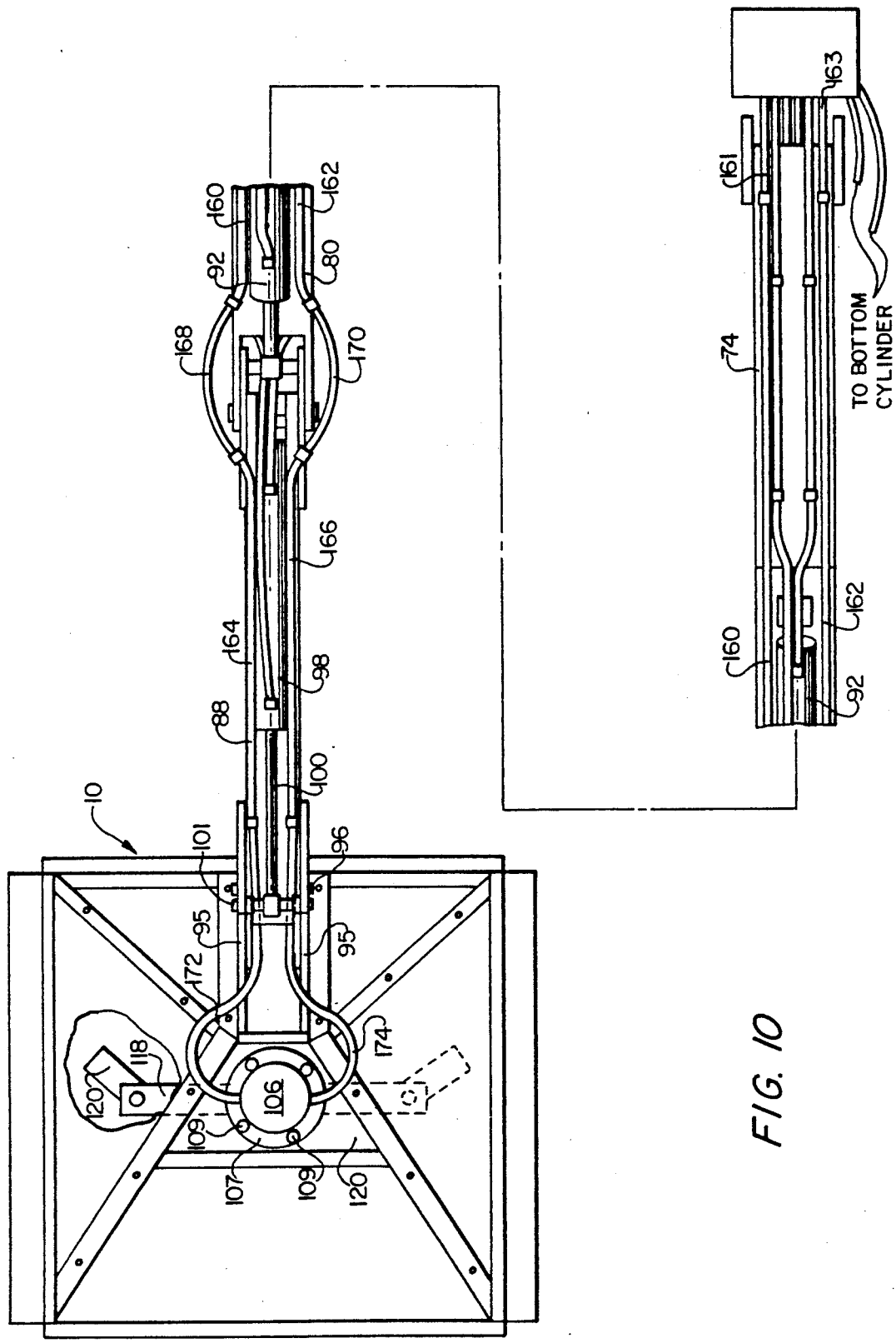
FIG. 10 is a top plan view of the boom and cutter housing.
Figure 14:
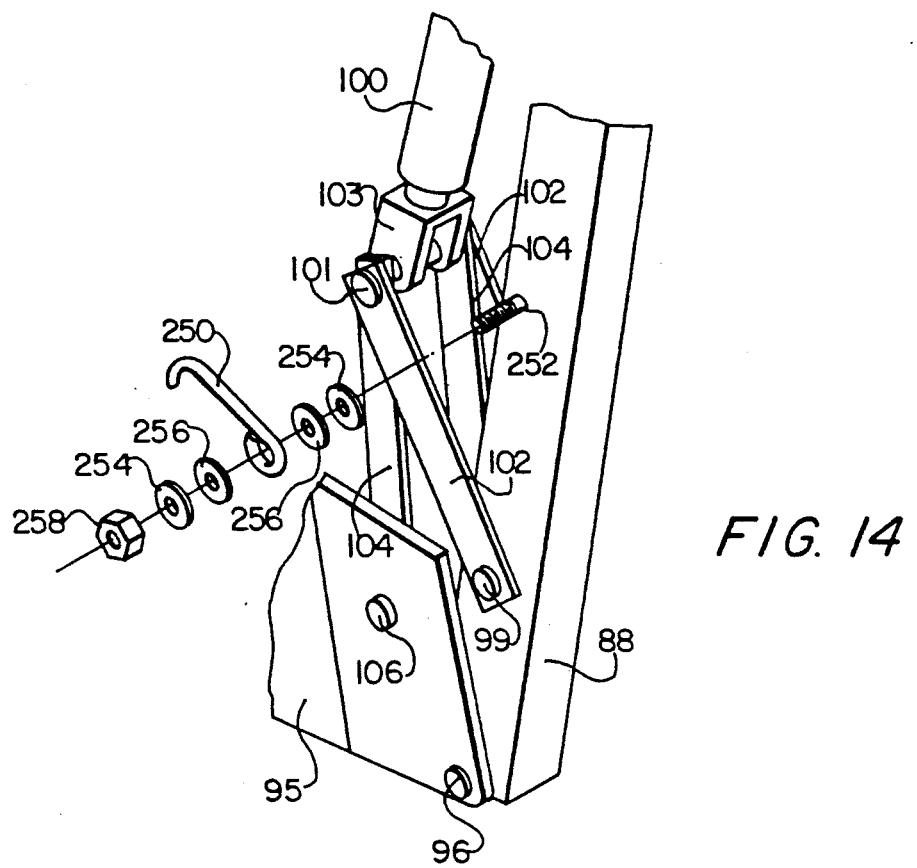
FIG. 14 is an enlarged exploded perspective view of the encircled area 14 of FIG. 2, which illustrates a first means for holding the boom and cutter components in a travel position.
Figure 14A:
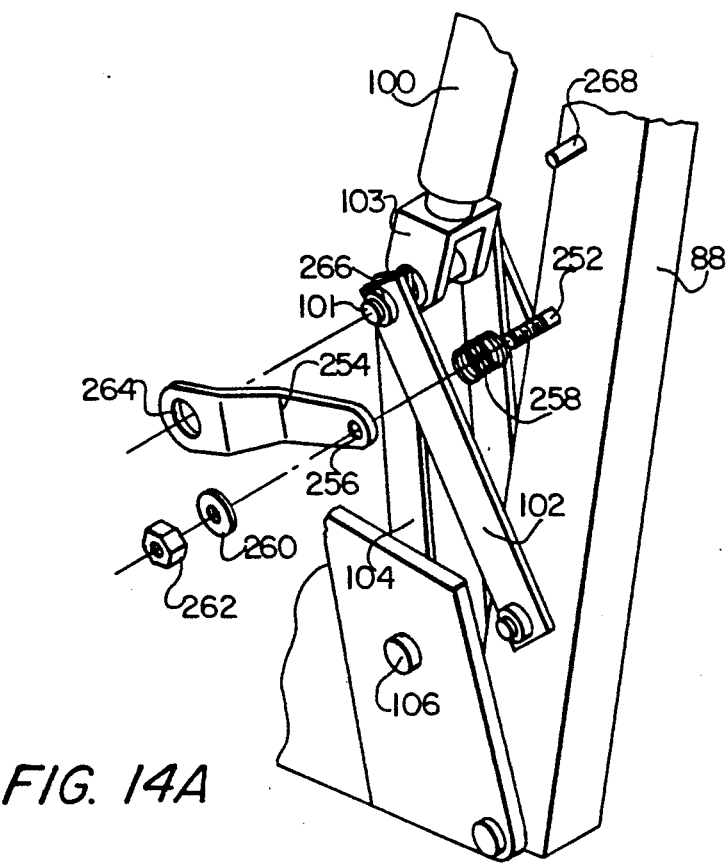
FIG. 14A illustrates a preferred means for holding the boom and cutter components in a travel position.

A cutter head coupler formed of a pair of spaced plates 95 (FIGS. 10 and 14) is pivoted at housing pivot means 96 to the outer end of the reach beam 88 and is pivoted about housing pivot means 96 in either direction by operation of a coupler or hydraulic pivot cylinder 98 having a rod 100 connected by a clevis 103 to a swing pivot means 101 mounted on the outer end of a swing link comprising parallel connected links 102. Swing links 102 are pivotally mounted on swing link pivot means 99 on reach beam 88. A coupling housing drive link means comprising parallel drive links 104 pivoted at their upper ends to pivot means 101 and at their lower ends to housing drive pivot 103 o head coupler 94 completes the drive linkage from rod 100. The distance between the axes of pivots 99 and 101 is approximately 11 15/16"; the distance between the axes of pivots 101 and 103 is approximately 11 15/16"; the distance between the axes of pivots 96 and 103 is approximately 6¼"; and the distance between the axes of pivots 96 and 99 is approximately 7". The foregoing construction is significant in that it permits the cutter housing 10 to be pivoted by cylinder 98 in excess of 180° (approximately 187°) about housing pivot means 96 between extreme positions P1 and P2 as shown in FIG. 1. Consequently, the device can be used to cut vegetation in a wide variety of slopes (such as when in P2 position) and the upper portions of trees and bushes (such as when in P1 position).

A hydraulic blade drive motor 106 is mounted by bolts 105 (FIG. 8) on a cast ductile iron cutter shaft housing 107 which is in turn held in position on a top plate 108 of the cutter housing 10 by bolts 109. Motor 106 includes a splined power output shaft 110 operable for driving a conventional cutter blade 118 through the means illustrated in FIGS. 8 and 9. More specifically, the splined power output shaft 110 is received in a mating splined female opening 112 (FIG. 9) of a non-tapered cutter shaft or spindle 114 having a threaded upper end portion 116.

A 42-inch diameter cutter blade assembly 118 of conventional construction having pivotal outer blade tips 120 is attached to the lower end head portion 127 of cutter shaft or spindle 114 by conventional bolt means 122. The cutter shaft or spindle 114 includes an upper reduced diameter cylindrical portion 115 having threads 116 on its upper extent with a larger bearing engaging cylindrical portion 117 being below and adjacent portion 115. A connector portion 121 of cylindrical shape having an upper radial bearing support surface 123 is provided between portion 117 and end head portion 127. Spindle 114 is supported in the cutter shaft housing 107 by an upper tapered roller bearing assembly 124 and a similar, but inverted, lower tapered roller bearing assembly 126 as shown in FIG. 8. Bearing assemblies 124 and 126 respectively engage radial surfaces 125A and 125B of cutter shaft housing 107 as shown in FIG. 9.

A tab lock washer 128 (FIG. 9) having an inwardly extending tab 130 is mounted on upper cylindrical cutter shaft port 115 and engages the upper surface of the upper tapered roller bearing assembly 124 with the tab 130 extending into key slot 132 of the cutter shaft in a manner that will be apparent from FIG. 9. A spanner nut 134 is threaded on threads 116 and holds the tab lock washer 128 in compression in the aforementioned position and one of the outwardly extending tabs 131 of lock washer 128 is hammered into one of the outer slots 155 of spanner nut 134. The threads 116 are arranged so that if bearing failure occurs, the power fluid to motor 106 will be automatically bypassed to the reservoir to deactivate the motor but the shaft 112 will continue to rotate due to the momentum of the shaft and the blade; lock washer 128 will probably be destroyed and the shaft will drop downwardly so that upper bearing assembly 124 will be engaged by spanner nut 134. The spanner nut will consequently be rotated on thread 116 because of friction between nut 134 and bearing assembly 124 with such rotation moving the spanner not downwardly on threads 116. Thus, cutter shaft 114 will continue to be retained in the housing 107. In the prior art devices using tapered cutter supporting shafts, jamming of the bearing results in rotation of the retainer means for the blade in a direction which causes the retainer means to separate from the tapered cutter supporting shaft to permit the shaft and the attached blade to drop from the housing so as to create an extreme safety hazard.

A canopy support frame 136 (FIGS. 2 and 3) has left and right rear legs 137 and 138 having their lower ends attached to plates 26 and front legs 139 having lower ends attached to the U-shaped coupling or bridge frame 22. A rollbar 135 is also attached to plates 26.

Figure 3:
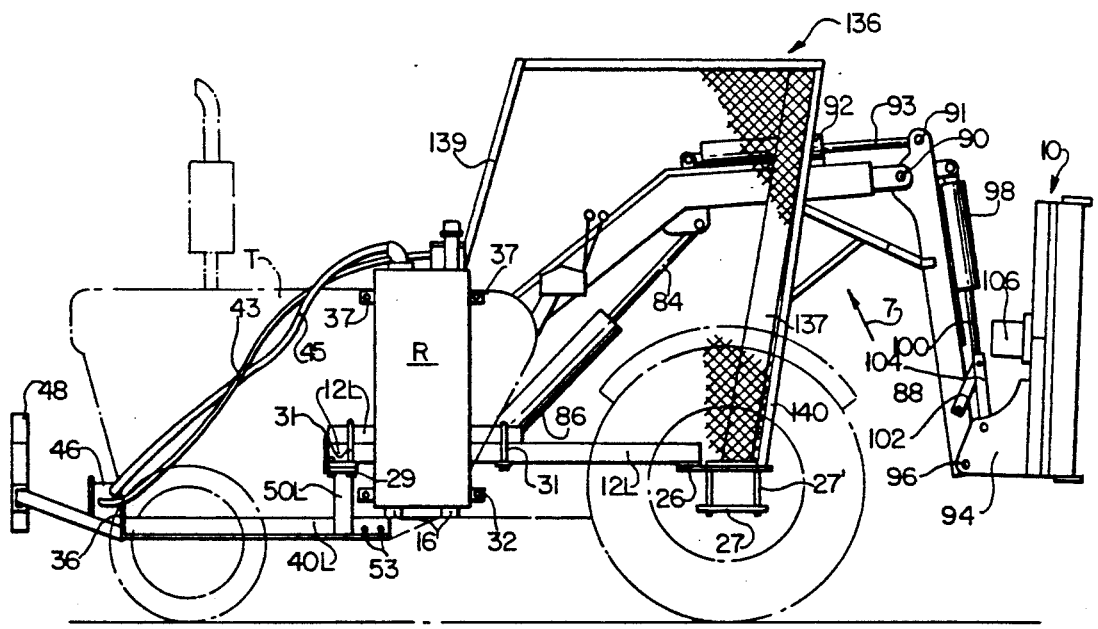
FIG. 3 is a left side elevation view similar to FIG. 2 with the assembly being in the over-the-road position of FIG. 2.
Figure 7:
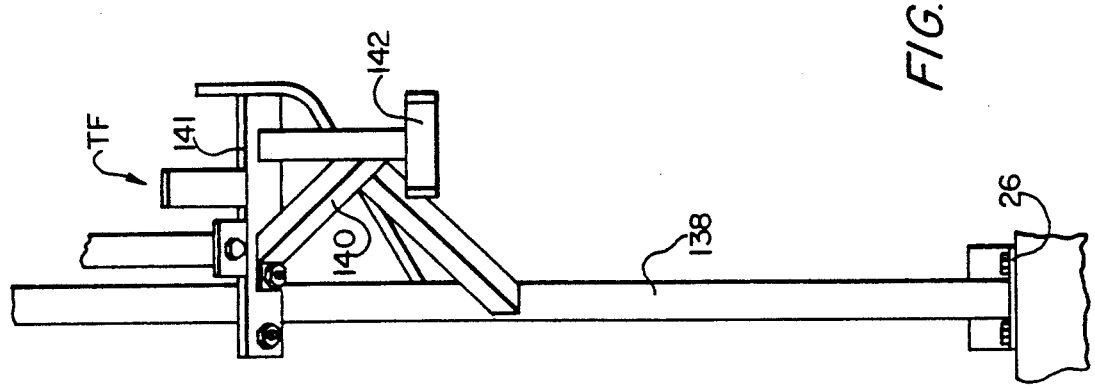
FIG. 7 is a view of the boom support means taken in the direction of arrow 7 in FIG. 3.
Figure 6:
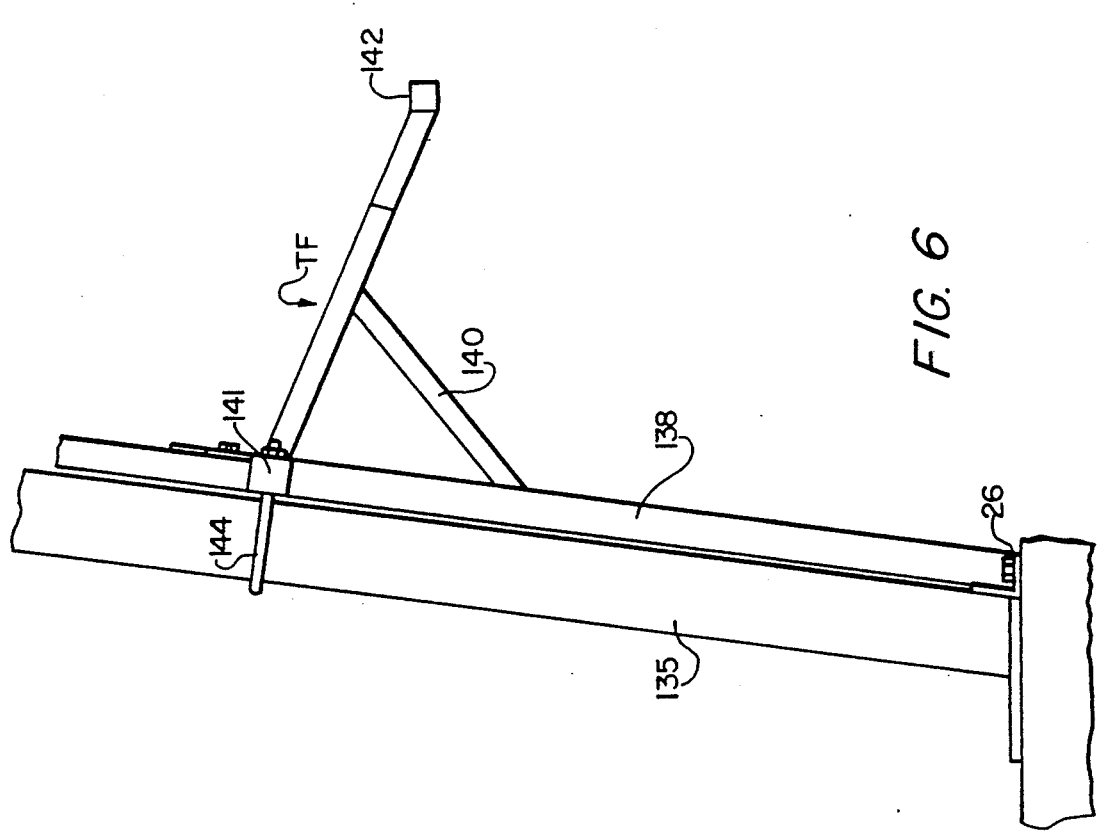
FIG. 6 is a side elevation view of the boom support means used during over-the-road movement.

A carrier or transport frame including a horizontal inner boom rest frame 141 and a reach boom rest 142 is attached along with bracing members 140 to the right rear leg 138 of the canopy support frame as best shown in FIGS. 6 and 7. The carrier transport frame receives and supports the boom and cutter housing in the position shown in FIGS. 2 and 3 for over the road or other travel of the tractor. It should also be noted that the transport frame is additionally braced and held in position by U-bolt means 144 engaged with the rollbar 135. Retention of the cutter housing in the travel position of FIGS. 2 and 3 is effected by a hook latch 250 (FIG. 14) pivotally mounted on threaded stud 252 welded to reach beam 88. Hook latch 250 is held in position by two thrust washers 254, two neoprene buffer washers 256 and a locknut 258.

A preferred apparatus for latching the boom and cutter housing for the road travel position of FIGS. 2 and 3 is illustrated in 14A. More specifically, a pivotable metal latch strap plate 254 has a small aperture 256 at its inner end which is loosely received over threaded stud 252 on reach beam 88 with a coil compression spring 258 being positioned between the pivotable latch strap plate 254 and reach beam 88 to urge the latch strap outwardly against a retaining washer 260 and locknut 262 provided on the threads on the outer end of threaded stud 252. The inner aperture of 256 is somewhat larger than the stud 252 so that the latch plate outer end which includes a larger holding aperture 264 fitable over a bushing 266 welded to and extending from link 102 which surrounds and protects the swing pivot means 101 extending coaxially therein. A storage stud 268 extends outwardly from reach beam 88 and is positioned so that the pivotable latch strap plate 254 can be positioned over the storage stud for retention while the apparatus is in unlatched condition during use. It should be noted that the spring 258 permits the outer end of the pivotable latch strap plate 254 to be pulled outwardly from contact with bushing 266 and then swung into position over the storage stud 268 (and vice versa) where it is removably held in position. The spring 258 permits the vibration of the equipment from causing the pivotable latch strap plate 254 from becoming disengaged from the storage stud while the machine is in operation.

Integral steel hydraulic lines 160 and 162 (FIG. 10) are provided on the inner boom components 74 and 80 and have their inner ends connected to flexible hose members 161 and 163 respectively connected to reservoir R and valve 47. Similar integral steel hydraulic lines 164 and 166 are provided on reach beam 88. Flexible hose means 168 connects the outer end of integral steel hydraulic line 160 to the inner end of line 164 and a similar flexible hose 170 connects the outer end of steel line 162 to the inner end of line 166. Similarly, hose means 172 and 174 respectfully connect the outer end of steel hydraulic lines 164 and 166 to the hydraulic motor 106. Relatively small internal steel hydraulic lines are also provided in the inner boom component for connection to the reach beam cylinder 92 by use of flexible hoses connected between the cylinder and the ends of the internal hydraulic lines.

Figure 4:
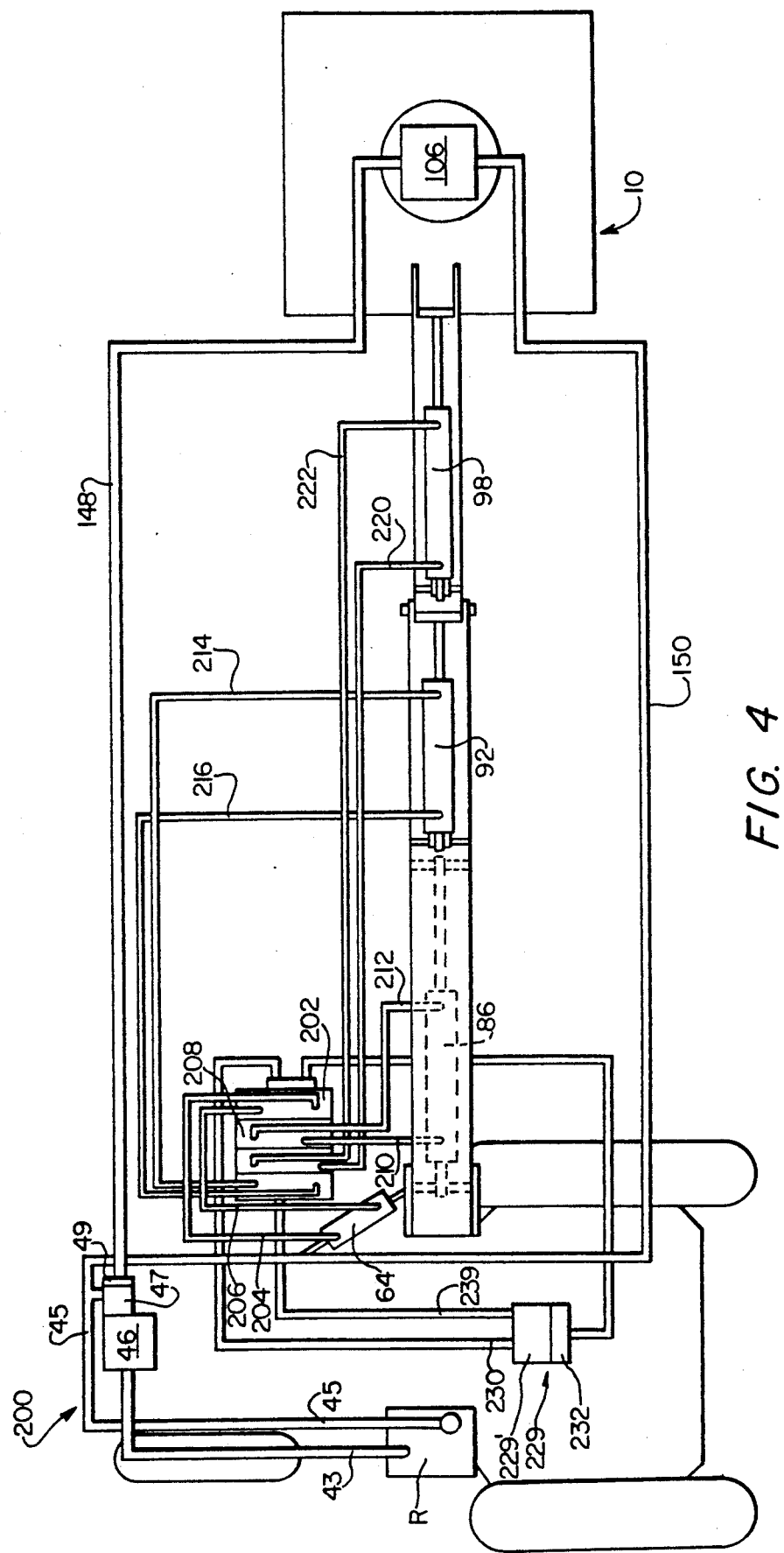
FIG. 4 is a schematic hydraulic circuit diagram illustrating the hydraulic circuitry employed for operating the cutter assembly.
Figure 5:
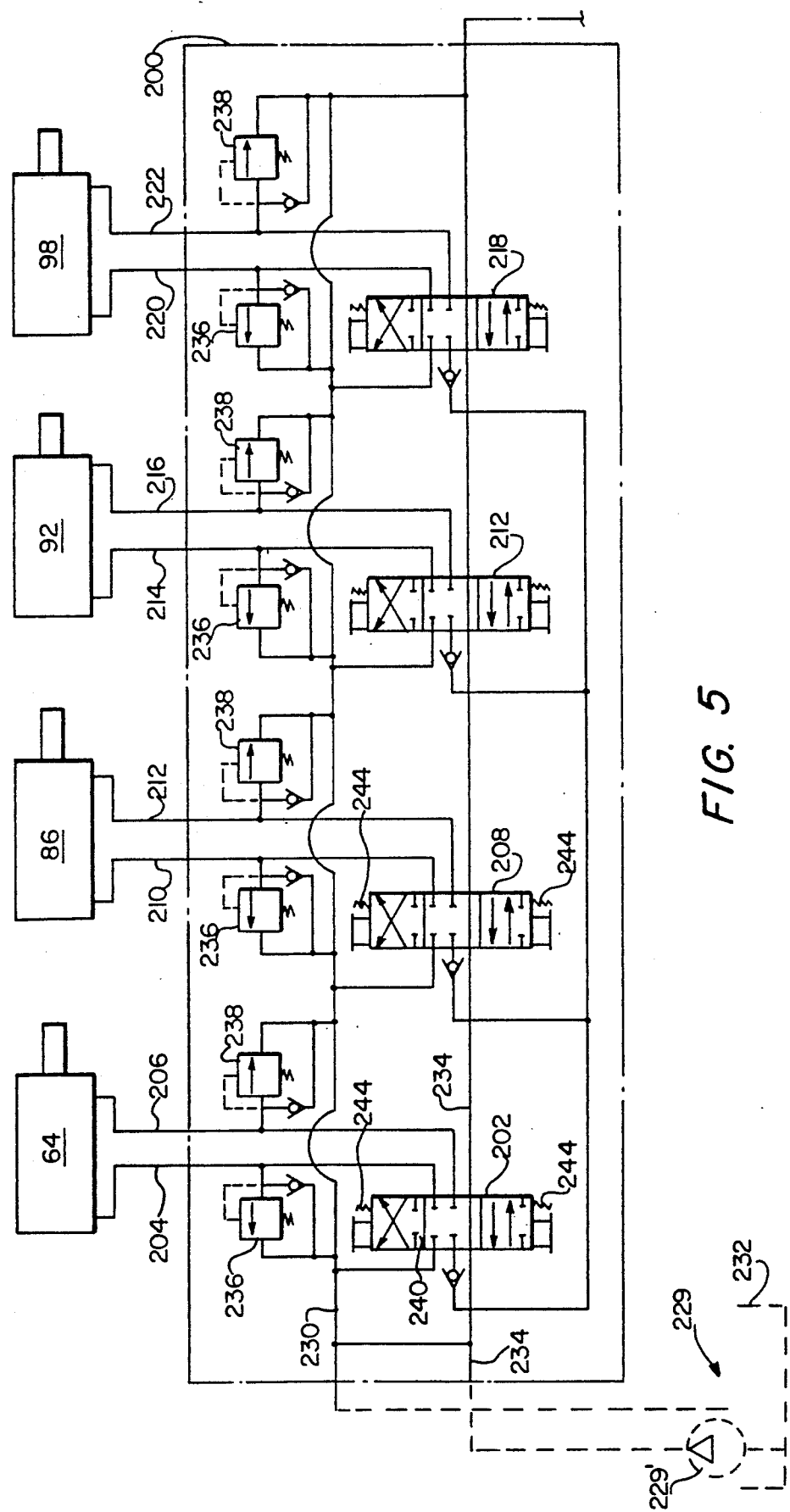
FIG. 5 is a more detailed view of the hydraulic circuitry.

FIG. 5 illustrates the boom control hydraulic circuitry, generally designated 200 for controlling and activating the boom swing cylinder 64, the lift cylinder 86, the reach cylinder 92 and the coupler or pivot cylinder 98 (see FIG. 4 also). A swing control valve 202 is connected to swing cylinder 64 by an extend hydraulic line 204 and a retract hydraulic line 206. Similarly, a lift control valve 208 is connected by an extend line 210 and retract 212 to the lift cylinder 86. In like manner, a reach control valve 212 is connected by an extend line 214 and a retract 216 to the reach cylinder 92 and a coupler or pivot control valve 218 is connected to the pivot cylinder 98 by an extend line 220 and a retract line 222.

The control valves 202, 208, 212 and 218 are identical to each other and therefore only valve 202 will be discussed in detail. Valve 202 includes a movable center spool 240 and is held in a center or "hold" position by centering springs 242.

Pressurized hydraulic fluid is pumped to the boom control cylinders by the built in tractor hydraulic supply system 229' which includes a pump 229 and a sump 232. The output of pump 229' flows into a main fluid supply line 234. An exhaust line 230 dumps spent fluid back into the sump 232. A high pressure "power beyond" line 239 returns unused high pressure fluid back to the tractor system 229. Each of the extend lines 204, 210, 214 and 220 is connected to an adjustable work port anti-void relief valve 236. The relief valves 236 are each individually adjusted to prevent pressure in the respective extend lines with which they are associated from exceeding a predetermined maximum value. More specifically, valve 236 prevents pressure in extend line 204 from exceeding 1200 psi; valve 236 connected to extend line 210 prevents the pressure in extend line 210 from exceeding 1660 psi; valve 236 prevents the pressure in extend line 214 from exceeding 1500 psi. In like manner, valves 238 prevent the pressure in retract lines 206, 212, 216 and 222 from exceeding 1000 psi.

The blade driving hydraulic motor 106 receives pressurized hydraulic fluid from pump 46 via a fluid supply conduit system schematically designated 148 in FIG. 4 which includes the previously discussed flexible hose 174, steel hydraulic line 166, flexible hose 170, steel hydraulic line 162 and hose 163 which is connected to the resistance check valve 49 (FIG. 4). An exhaust fluid return system generally designated 150 comprising flexible hose 172, steel hydraulic line 164, flexible hose 168, steel hydraulic line 160 and hose 161 is connected to return hose 45 for returning spent hydraulic fluid to reservoir R. A significant feature is the fact that motor 106 has 50% more displacement than the maximum displacement of pump 46. Consequently, blade 118 operates at 640 to 950 rpm as compared to conventional blades which operate at 1300 to 2600 rpm so that they create a much greater hazard of striking stones, etc. which are hurled at high velocity from the cutters.

The invention provides substantial advantages over the prior known devices including the fact that it is sufficiently light as to be usable on smaller tractors without the need for any counterweight being associated with the device. The boom controlling hydraulic cylinder system operates at 1000 to 1500 psi whereas prior devices operate at 2000 to 2500 psi.

Switch means on the tractor control panel or other convenient location is operated to terminate the flow of high pressure fluid to motor 106 when it is desired to stop the apparatus; the output from pump 46 is consequently directed to reservoir R and the pressure in pressure controlled check valve 49 quickly falls. When the pressure in valve 49 falls to approximately 50 psi, valve 49 self actuates to block any flow of fluid back from motor 106 and conduit 148 to valve 49 so that hydraulic fluid remains in the motor and creates sufficient drag resistance to continued rotation of the motor to causes the motor and blade to stop rotation in 25 to 35 seconds in comparison to prior art devices in which the blade will continue to rotate for two or more minutes following power cutoff.

A primary advantage of the subject invention is the fact that it can be attached or detached from the tractor in a minimum of time as a consequence of the simplicity of the supporting frame etc. The cutterhead power supply system operates on 50 psi back pressure as opposed to 500 psi back pressure in prior art devices so that the possibility of hydraulic fluid leakage and/or overheating is substantially reduced. The avoidance of bypassing any hydraulic circuit permits the device to be stopped in a much smaller time than is possible with the prior art devices.

The apparatus permits the boom to be extended so that the outer tip of the cutter blade is a full sixteen feet from the centerline of the tractor, a feat a particular significance in view of the fact that the tractor is a light weight 35 to 50 horsepower type in the range of 3,800 pounds to 4,600 pounds weight. Even more significantly, there is no use of counterweights in the invention to counteract the weight of the boom although such counterweights are universally required for prior art devices of the same reach and cutter capacity.

A further advantage of the present invention resides in the fact that the non-tapered cutter shaft is substantially cheaper to manufacture than previously known tapered cutter shafts and is retained in the housing even upon a jamming of the mechanism as is discussed above. Additionally, the cutter shaft is substantially stronger in that it has approximately three times the strength of a comparable tapered cutter shaft.

While preferred embodiments of the invention have been disclosed, it should be understood that the spirit and scope of the invention is not to be limited to the exact disclosure as obvious modifications will undoubtedly occur to those of skill in the art. Therefore, the scope of the invention is to be limited solely by the appended claims.

I claim:

1. A tractor mountable power driven vegetation cutting means comprising:
   A. A boom support frame including:
   (1) a right front to rear extending horizontal side frame having right rear connection permitting means adjacent its rear extent for permitting rigid connection to the right rear axle housing and right front connection permitting means provided at its front extent;
   (2) a left front to rear extending horizontal side frame having left rear connection permitting means adjacent its rear extent for permitting rigid connection to the left rear axle housing and left front connection permitting means provided at its front extent;
   (3) a generally U-shaped front frame including a forward transverse front plate having a right end and a left end and including supporting central connection permitting means for permitting fixed connection to a forward portion of the tractor ahead of the front axle of the tractor, a right hand trailing frame extending rearwardly from said right end portion of said forward transverse plate frame and including right side frame connection permitting means for permitting rigid connection of a rear portion of said right hand trailing frame to said right front connection permitting means of said right front-to-rear extending horizontal side frame and a left hand trailing frame extending rearwardly from said left end of said forward transverse connector frame and including left side frame connection permitting means for permitting rigid connection of a rear portion of said left hand trailing frame to said left front connection permitting means of said left front-to-rear extending horizontal side frame;

(4) a bridge frame comprising vertically extending right leg means having upper and lower ends, vertically extending left leg means having upper and lower ends, a transverse horizontal coupling beam having right and left ends respectively connected to said upper ends of said right vertically extending leg means and said left vertically extending leg means and right and left medial connection permitting means in lower portions of said right and left vertically extending leg means for permitting rigid connection of said right and left vertically extending leg means respectively to medial portions of said right and left front to rear extending horizontal side frames;

B. an articulated support boom having an inner end and an outer end;

C. a housing pivot means on the outer end portion of said articulated support boom, a rotary cutter blade and a cutter blade housing pivotally mounted on said housing pivot means; and D. swing bracket means for permitting connection of said inner end of said articulated support boom to one of said vertically extending leg means for providing support for said articulated boom for both horizontal and vertical swinging movement.

2. The vegetation cutting means of claim 1 wherein said right side frame connection permitting means includes a right hand canted drop frame having a lower end connected to said right hand trailing frame and an upper end removably connectable to a forward portion of said right front to rear extending horizontal side frame and said left side frame connection permitting means includes a left hand canted drop frame having a lower end connected to said left hand trailing frame and an upper end removably connectable to a forward portion of said left front to rear extending horizontal side frame.

3. The vegetation cutting means of claim 2 wherein said cutter blade housing pivot means comprises a double acting housing pivot hydraulic cylinder having an axially moveable rod with an outer end, swing link means having an inner end and an outer end, swing link pivot means pivotally supporting said inner end of said swing link means on said articulated support boom for pivotal movement about a pivot axis spaced inwardly from said housing pivot means, a swing pivot means mounted on said outer end of said swing link means, said outer end of said rod being pivotally connected to said swing pivot means, housing drive pivot means on said cutter blade housing, drive link means having first and second ends with said first end being pivotally connected to said swing pivot means and being pivotally connected at said second end to said housing drive pivot means, said pivot means and said link means being dimensioned and positioned to permit pivotal movement of said cutter blade housing about said housing pivot means through an arc substantially in excess of 90°.

4. The vegetation cutter of claim 3 wherein said arc is approximately 180°.

5. The vegetation cutting means of claim 1 wherein said cutter blade housing pivot means comprises a double acting hydraulic cylinder having an axially moveable rod with an outer end, swing link means having an inner end and an outer end, swing link pivot means pivotally supporting said inner end of said swing link means on said articulated support boom for pivotal movement about a pivot axis spaced inwardly from said housing pivot means, a swing pivot means mounted on said outer end of said swing link means, said outer end of said rod being pivotally connected to said swing pivot means, housing drive pivot means on said cutter blade housing, drive link means having first and second ends with said first end being pivotally connected to said swing pivot means and being pivotally connected at said second end to said housing drive pivot means, said pivot means and said link means being dimensioned and positioned to permit pivotal movement of said cutter blade housing about said housing pivot means through an arc substantially in excess of 90°.

6. The vegetation cutter of claim 5 wherein said arc is approximately 180°.

7. A tractor mountable vegetation cutter as recited in claim 1 additionally including hydraulic blade drive motor means mounted on said cutter blade housing for driving said rotary cutter blade and a hydraulic pump and circuit for providing work fluid to said hydraulic blade drive motor means and valve means for supplying or denying work fluid to said motor including a check valve means for preventing return flow from the motor to the hydraulic pump.

8. The vegetation cutting means of claim 7 wherein said right side frame connection permitting means includes a right hand canted drop frame having a lower end connected to said right hand trailing frame and an upper end removably connectable to a forward portion of said right front to rear extending horizontal side frame and said left side frame connection permitting means includes a left hand canted drop frame having a lower end connected to said left hand trailing frame and an upper end removably connectable to a forward portion of said left front to rear extending horizontal side frame.

9. The vegetation cutting means of claim 8 wherein said cutter blade housing pivot means comprises a double acting housing pivot hydraulic cylinder having an axially moveable rod with an outer end, swing link means having an inner end and an outer end, swing link pivot means pivotally supporting said inner end of said swing link means on said articulated support boom for pivotal movement about a pivot axis spaced inwardly from said housing pivot means, a swing pivot means mounted on said outer end of said swing link means, said outer end of said rod being pivotally connected to said swing pivot means, housing drive pivot means on said cutter blade housing, drive link means having first and second ends with said first end being pivotally connected to said swing pivot means and being pivotally connected at said second end to said housing drive pivot means, said pivot means and said link means being dimensioned and positioned to permit pivotal movement of said cutter blade housing about said housing pivot means through an arc substantially in excess of 90°.

10. A tractor mountable power driven vegetation cutting means including:
 A. a boom support frame including:
  (1) first and second front to rear extending side frame members respectively mountable adjacent first and second sides of a tractor chassis;
  (2) first and second vertically extending leg means respectively connected to and extending upwardly from said first and second front to rear extending side frame members;
  (3) transverse coupling frame means extending between and connecting upper portions of said first and second vertically extending leg means;
 B. a boom hinge means having a fixed hinge component mounted on one of said vertically extending by means and a moveable hinge component mounted for pivotal movement about a first pivot axis;
 C. a boom having an inner end and an outer end;
 D. pivot means for attaching said inner end of said boom to said moveable hinge component for movement therewith about said first pivot axis and for movement about a second pivot axis oriented perpendicularly to said first pivot axis; and
 E. power driven rotary blade cutter housing pivotally mounted on the outer end of said boom.

11. A tractor mountable power driven vegetation cutter as recited in claim 10 additionally including a hydraulic pivot cylinder mounted on an outer portion of said boom and power transmission means connecting said hydraulic pivot cylinder to said rotary blade cutter housing for effecting pivotal movement of said rotary blade cutter housing through a cutter housing swing arc in excess of 170 degrees extent.

12. A tractor mountable power driven vegetation cutter as recited in claim 11 wherein said cutter housing swing arc has a maximum extent of approximately 187 degrees.

13. A tractor mountable power driven vegetation cutter as recited in claim 10 wherein said power driven rotary blade cutter includes:
 A. a cutter shaft housing top plate having a central aperture;
 B. a spindle support mounted on said top plate and having an axial opening aligned with said central aperture and also including a first bearing positioning radial surface facing upwardly and a second bearing positioning radial surface facing downwardly;
 C. upper and lower cone bearing assemblies respectively engaging said first and second bearing position radial component surfaces and each cone bearing assembly having an inner cylindrical bearing opening;
 D. a blade support spindle having a vertical axis, an upper reduced diameter cylindrical portion diameter, a lower cylindrical surface of greater diameter than said upper cylindrical surface but being slightly less than the diameter of said inner cylindrical bearing openings a radial surface connecting said upper and lower cylindrical portions, a threaded surface on the upper end of said upper reduced diameter cylindrical portion, a downwardly extending splined female opening in the upper end of said spindle and a key slot extending downwardly and inwardly in said threaded surface; and
 E. a hydraulic motor having a power input shaft having a splined lower end matingly received in said splined female opening for drivingly rotating said blade support spindle about it vertical axis; and
 F. a spanner nut on said threaded surface positioned to engage said upper bearing assembly in the event of a bearing failure to consequently be rotated to be moved downwardly on said blade support spindle to retain said spindle in said spindle support.

14. A tractor mountable power driven vegetation cutter as recited in claim 13 additionally including a hydraulic pivot cylinder mounted on an outer portion of said boom and power transmission means connecting said hydraulic pivot cylinder to said rotary blade cutter housing for effecting pivotal movement of said rotary blade cutter housing through a cutter housing swing arc in excess of 170 degrees extent.

15. A tractor mountable power driven vegetation cutting means as recited in claim 3 additionally including a metal strap having inner and outer ends and an aperture on its outer end, said metal strap being pivotally mounted on its inner end on said outer end of said articulated support boom so as to be movable for engagement of said aperture on its outer end with said swing pivot when said housing pivot is fully retracted to hold said swing pivot in fixed position and prevent pivotal movement of said cutter blade housing and also movable to a stowed condition on a fixed stud on said outer end of said articulated support beam.

16. The vegetation cutter of claim 15 wherein said arc is approximately 180°.

17. A tractor mountable power driven vegetation cutting means as recited in claim 5 additionally including a metal strap having inner and outer ends and an aperture on its outer end, said metal strap being pivotally mounted on its inner end on said outer end of said articulated support boom movable for engagement of an aperture on its outer end with said swing pivot when said housing pivot is fully retracted to hold said swing pivot in fixed position and prevent pivotal movement of said cutter blade housing and also movable to a stowed condition on a fixed stud on said outer end of said articulated support beam.

18. The invention of claim 1 wherein said power driven vegetation cutting means weighs no more than 2500 pounds including hydraulic fluid and is mountable and operable on a 35 to 50 horsepower tractor having a weight in the range of 3800 to 4600 pounds without the use of any counterweights.

* * * * *